(12) United States Patent
Lehner

(10) Patent No.: US 6,757,850 B1
(45) Date of Patent: Jun. 29, 2004

(54) REMOTE SERVICES MANAGEMENT FAULT ESCALATION

(75) Inventor: Kenneth S. Lehner, Tinton Falls, NJ (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/223,015

(22) Filed: Dec. 30, 1998

(51) Int. Cl.[7] .............................................. G06F 1/00
(52) U.S. Cl. ........................ 714/48; 714/25; 709/224
(58) Field of Search ........................... 714/48, 43, 54, 714/57, 2, 49, 44, 25–28, 32, 39; 709/223, 224, 249, 250; 345/705

(56) References Cited

U.S. PATENT DOCUMENTS

| | | | |
|---|---|---|---|
| 3,783,255 A | | 1/1974 | Buedel ................ 235/153 AK |
| 3,784,801 A | | 1/1974 | Caputo et al. ........ 235/153 AK |
| 3,805,038 A | | 4/1974 | Buedel et al. ........ 235/153 AK |
| 4,873,687 A | | 10/1989 | Breu ........................ 371/8.2 |
| 5,182,705 A | | 1/1993 | Barr et al. ................. 364/401 |
| 5,325,517 A | | 6/1994 | Baker et al. ............... 395/575 |
| 5,367,667 A | * | 11/1994 | Wahlquist et al. .......... 714/32 |
| 5,487,148 A | * | 1/1996 | Komori et al. ............ 714/31 |
| 5,551,043 A | | 8/1996 | Crump et al. ............. 395/750 |
| 5,557,515 A | | 9/1996 | Abbruzzese et al. ... 364/401 R |
| 5,603,038 A | | 2/1997 | Crump et al. ............. 395/750 |
| 5,708,775 A | * | 1/1998 | Nakamura .................. 714/48 |
| 5,742,762 A | * | 4/1998 | Scholl et al. ............. 709/223 |
| 5,748,884 A | * | 5/1998 | Royce et al. .............. 714/48 |
| 5,758,071 A | * | 5/1998 | Burgess et al. ........... 709/100 |
| 5,802,304 A | * | 9/1998 | Stone ....................... 709/223 |
| 5,815,652 A | * | 9/1998 | Ote et al. .................. 714/31 |
| 5,862,322 A | * | 1/1999 | Anglin et al. .............. 714/48 |
| 5,893,905 A | * | 4/1999 | Main et al. ................. 705/11 |
| 5,961,594 A | * | 10/1999 | Bouvier et al. ........... 709/223 |
| 5,996,010 A | * | 11/1999 | Leong et al. ............. 709/223 |
| 6,023,507 A | * | 2/2000 | Wookey .................... 380/21 |
| 6,026,500 A | * | 2/2000 | Topff et al. ................ 714/26 |
| 6,029,258 A | * | 2/2000 | Ahmad ..................... 714/46 |
| 6,047,261 A | * | 4/2000 | Siefert ....................... 705/11 |
| 6,112,235 A | * | 8/2000 | Spofford ................... 709/223 |
| 6,145,001 A | * | 11/2000 | Scholl et al. ............. 709/223 |
| 6,170,067 B1 | * | 1/2001 | Liu et al. ................... 714/48 |
| 6,199,180 B1 | * | 3/2001 | Ote et al. .................. 714/31 |
| 6,205,579 B1 | * | 3/2001 | Southgate ................. 717/11 |
| 6,219,708 B1 | * | 4/2001 | Martenson ............... 709/226 |
| 6,230,286 B1 | * | 5/2001 | Shapiro et al. ............ 714/23 |
| 6,230,287 B1 | * | 5/2001 | Pinard et al. .............. 714/31 |
| 6,260,048 B1 | * | 7/2001 | Cparenter et al. ........ 707/104 |
| 6,260,160 B1 | * | 7/2001 | Beyda et al. .............. 714/27 |
| 6,289,378 B1 | * | 9/2001 | Meyer et al. ............. 709/223 |
| 6,308,205 B1 | * | 10/2001 | Carcerano et al. ........ 709/221 |
| 6,339,789 B1 | * | 1/2002 | Sugauchi et al. ......... 709/223 |
| 6,363,421 B2 | * | 3/2002 | Barker et al. ............. 709/223 |
| 6,393,475 B1 | * | 5/2002 | Leong et al. ............. 709/223 |
| 6,430,595 B1 | * | 8/2002 | Ferguson et al. ......... 709/200 |
| 6,446,134 B1 | * | 9/2002 | Nakamura ................ 709/313 |

FOREIGN PATENT DOCUMENTS

GB           2329046      * 10/1999      ........... G06F/17/00

* cited by examiner

Primary Examiner—Paul R. Myers
Assistant Examiner—Raymond N Phan
(74) Attorney, Agent, or Firm—Lowe Hauptman Gilman & Berner LLP

(57) ABSTRACT

A remote services management (RSM) fault escalation mechanism is disclosed which provides the ability to send electronic mail to one or more preselected recipients (the selection based upon criteria such as the type of fault, type of machine and customer) on the occurrence of an escalatable fault on a customer computer. The fault and the e-mail routing data is stored in a relational database. If a recipient of the e-mail does not respond by entering an "incident number" in the database via a Web interface within a predetermined time interval, a daemon process which scans the database at preselected intervals sends a second piece of e-mail to one or more other recipients (with a copy to the primary e-mail recipient). If none of the recipients responds within another time interval, the daemon process inserts into another table an entry containing a paging phone number and predetermined (based on the selection criteria above) numeric value, and also logs the lack of response. A second daemon process examines this table at regular intervals, and processes each entry contained in the table.

19 Claims, 5 Drawing Sheets

REMOTE SERVICES MANAGEMENT FAULT ESCALATION

FIELD OF THE INVENTION

The present invention relates generally to computer network fault management systems, and more particularly, to a computer network fault management system having the capability to send e-mail to pre-selected recipients upon the determination of a fault for a computer on a network.

BACKGROUND OF THE INVENTION

Wide area networks (WAN) have computer systems remotely located from one or more central servers. The central server may be located at a customer support center (CSG) having support personnel located at the CSG for supporting all the computer systems on the WAN. The WAN may often be used for providing customer services, such as banking services. The remotely located computer systems are used by customers who are being charged for functionality provided by the customer support center.

In the event of a remote computer failure or fault, there is currently no process of ensuring that notification of an occurrence of a fault is provided to appropriate remotely located support personnel in a reliable and timely manner. With such a process, it would be possible to do both reactive and proactive maintenance of customer equipment, thereby raising the perceived and actual level of service provided to the customer. A need exists in the art for such a process and apparatus.

SUMMARY OF THE INVENTION

It is therefore an object of the invention to provide a customizable, reliable and timely mechanism and apparatus for alerting customer support personnel to the occurrence of a fault on a customer computer using electronic mail, a relational database, Web technology and paging technology.

Another object of the present invention is to determine whether the customer support personnel have responded to the alert.

Yet a further object of the present invention is to log information concerning the fault and whether the customer support personnel have responded to the fault in one or more databases.

According to the present invention, a remote services management (RSM) fault escalation mechanism provides the ability to send electronic mail to one or more preselected recipients (the selection based upon criteria such as the type of fault, type of machine and customer) on the occurrence of an escalatable fault on a customer computer. The fault and the e-mail routing data is stored in a relational database.

If a recipient of the e-mail does not respond by entering an "incident number" in the database via a Web interface within a predetermined time interval, a daemon process which scans the database at preselected intervals sends a second piece of e-mail to one or more other recipients (with a copy to the primary e-mail recipient). If none of the recipients responds within another time interval, the daemon process inserts into another table an entry containing a paging phone number and predetermined (based on the selection criteria above) numeric value, and also logs the lack of response. A second daemon process examines this table at regular intervals, and processes each entry contained in the table.

These and other objects of the present invention are achieved by a method of notifying at least one remote support person of a fault on a computer system on a computer network. It is determined that a fault has occurred on a computer on the computer network. Notification of the fault is sent to a first remote support person. If the remote support person does not respond within a predetermined time interval, notification is sent to another remote support person.

The foregoing and other objects of the present invention are achieved by an article including at least one sequence of machine executable instructions on a medium bearing the executable instructions in machine readable form, wherein execution of the instructions by one or more processors causes the one or more processors to determine a fault has occurred on a computer on the computer network. Notification of the fault is sent to a first remote support person. If the remote support person does not respond within a predetermined time interval, notification is sent to another remote support person.

The foregoing and other objects of the present invention are achieved by a computer architecture including determining means for determining a fault has occurred on a computer on the computer network. Sending means are provided for sending notification of the fault to a first remote support person. Notification means are provided for sending notification to another remote support person if the remote support person does not respond within a predetermined time interval.

The foregoing and other objects of the present invention are achieved by a computer system including a processor and a memory coupled to the processor. The memory has stored therein sequences of instructions, which, when executed by the processor, causes said processor to perform the steps of determining a fault has occurred on a computer on the computer network. The processor then sends notification of the fault to a first remote support person and if the remote support person does not respond within a predetermined time interval, sends notification to another remote support person.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without, departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

BEST MODE FOR CARRYING OUT THE INVENTION

A method and apparatus for notifying remote support personnel of a computer fault on a computer network are described. In the following description, for purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Hardware Overview

Figure 1:
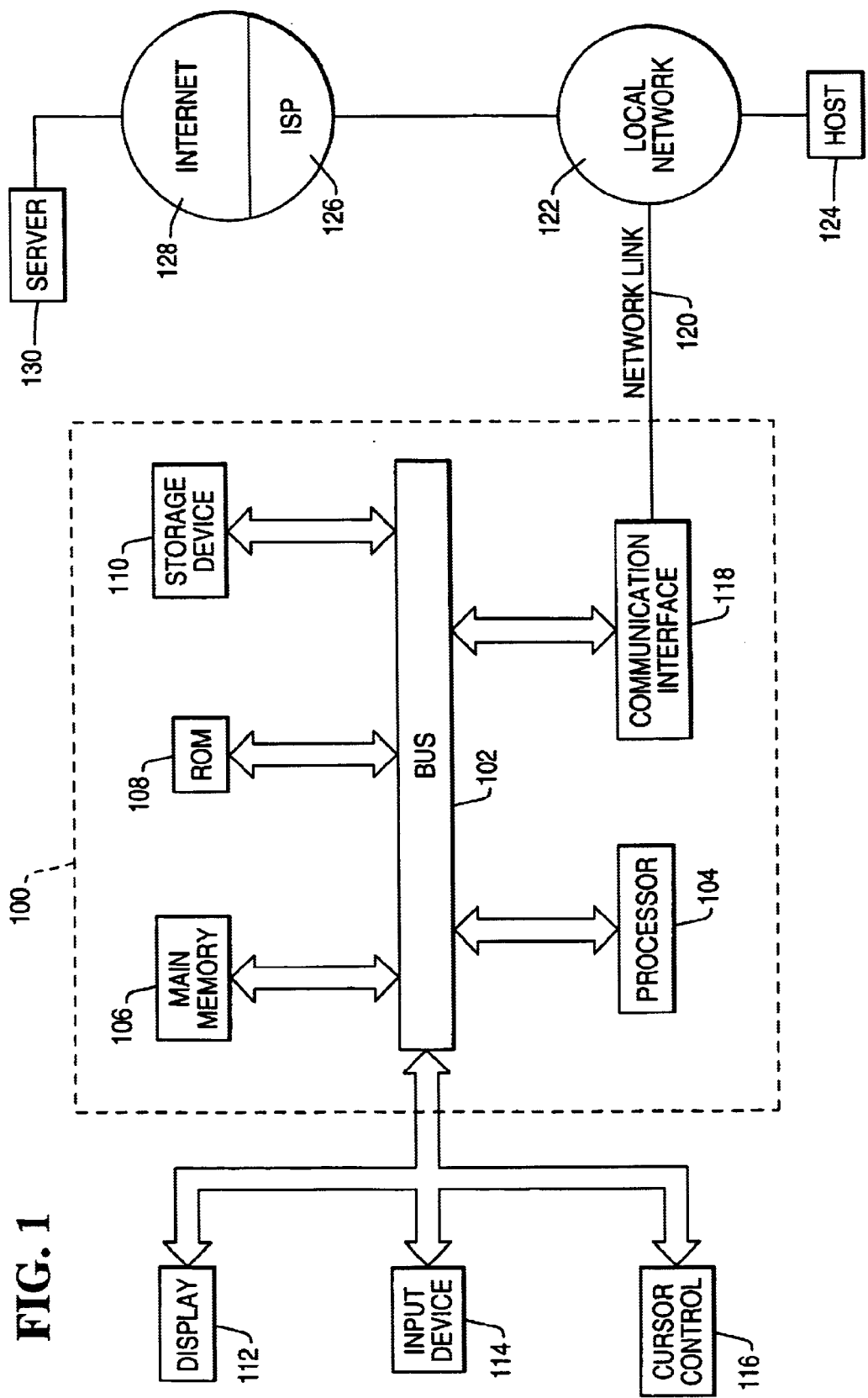
FIG. 1 is a high level block diagram of a computer system usable with the present invention.

FIG. 1 is a block diagram illustrating an exemplary computer system 100 upon which an embodiment of the invention may be implemented. The present invention is usable with currently available personal computers, mini-mainframes and the like.

Computer system 100 includes a bus 102 or other communication mechanism for communicating information, and a processor 104 coupled with the bus 102 for processing information. Computer system 100 also includes a main memory 106, such as a random access memory (RAM) or other dynamic storage device, coupled to the bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to the bus 102 for storing static information and instructions for the processor 104. A storage device 110, such as a magnetic disk or optical disk, is provided and coupled to the bus 102 for storing information and instructions.

Computer system 100 may be coupled via the bus 102 to a display 112, such as a cathode ray tube (CRT) or a flat panel display, for displaying information to a computer user. An input device 114, including alphanumeric and other keys, is coupled to the bus 102 for communicating information and command selections to the processor 104. Another type of user input device is cursor control 116, such as a mouse, a trackball, or cursor direction keys for communicating direction information and command selections to processor 104 and for controlling cursor movement on the display 112. This input device typically has two degrees of freedom in two axes, a first axis (e.g., x) and a second axis (e.g.,) allowing the device to specify positions in a plane.

The invention is related to the use of a computer system 100, such as the illustrated system, to notify remote support personnel of a fault on a remote customer computer. According to one embodiment of the invention, remote and display is provided by computer system 100 in response to processor 104 executing sequences of instructions contained in main memory 106. Such instructions may be read into main memory 106 from another computer-readable medium, such as storage device 110. However, the computer-readable medium is not limited to devices such as storage device 110. For example, the computer-readable medium may include a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave embodied in an electrical, electromagnetic, infrared, or optical signal, or any other medium from which a computer can read. Execution of the sequences of instructions contained in the main memory 106 causes the processor 104 to perform the process steps described below. In alternative embodiments, hard-wired circuitry may be used in place of or in combination with computer software instructions to implement the invention. Thus, embodiments of the invention are not limited to any specific combination of hardware circuitry and software.

Computer system 100 also includes a communication interface 118 coupled to the bus 102. Communication interface 108 provides a two-way data communication as is known. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. In the preferred embodiment communication interface 118 is coupled to a virtual blackboard. Wireless links may also be implemented. In any such implementation, communication interface 118 sends and receives electrical, electromagnetic or optical signals which carry digital data streams representing various types of information. Of particular note, the communications through interface 118 may permit transmission or receipt of the alerts and notifications. For example, two or more computer systems 100 may be networked together in a conventional manner with each using the communication interface 118.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication services through the world wide packet data communication network now commonly referred to as the "Internet" 128. Local network 122 and Internet 128 both use electrical, electromagnetic or optical signals which carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118. In accordance with the invention, one such downloaded application provides for information discovery and visualization as described herein.

The received code may be executed by processor 104 as it is received, and/or stored in storage device 110, or other non-volatile storage for later execution. In this manner, computer system 100 may obtain application code in the form of a carrier wave.

Configuration Information Management

Figure 2:
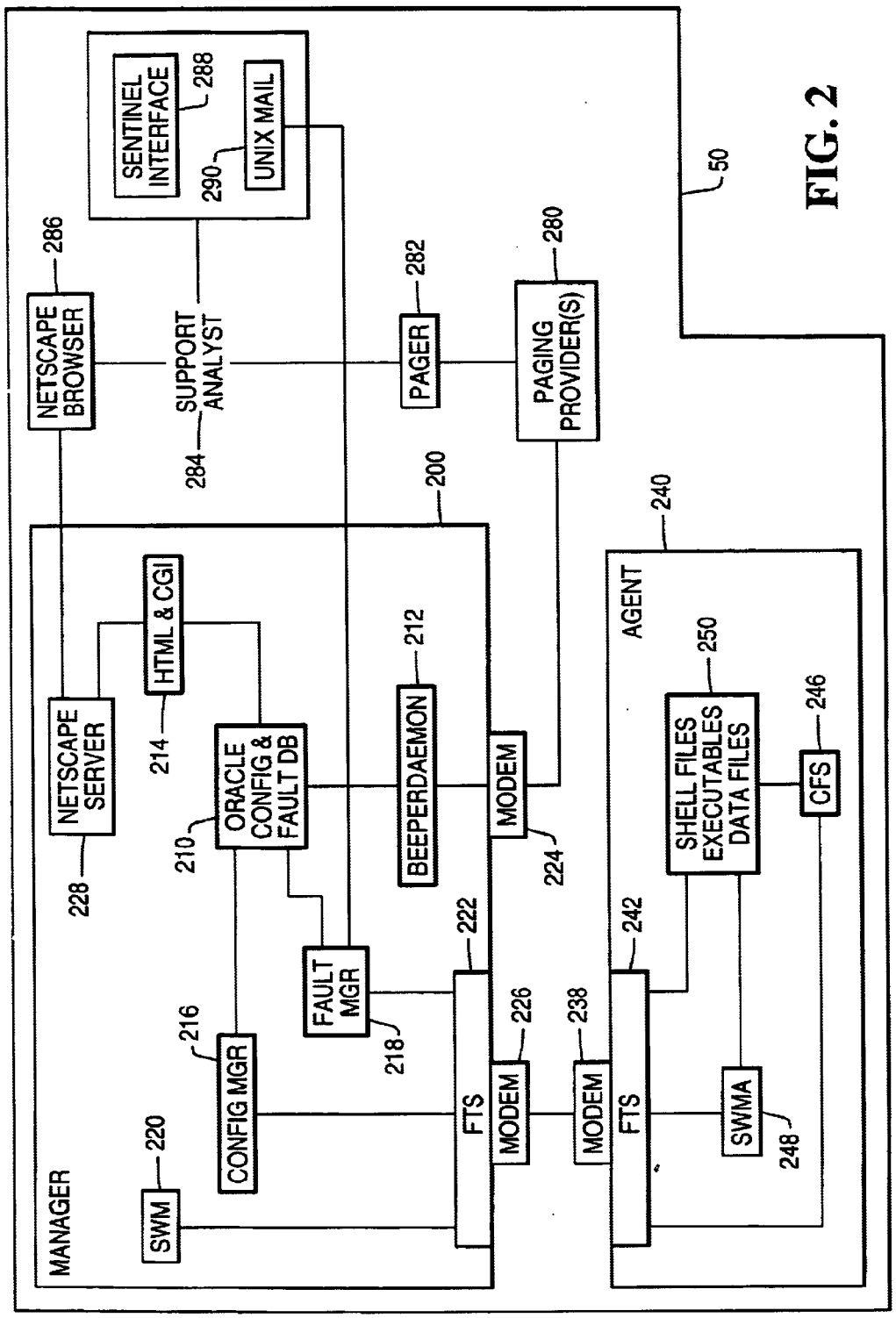
FIG. 2 is a diagram of a logical architecture and network usable with the present invention.
Figure 3A:
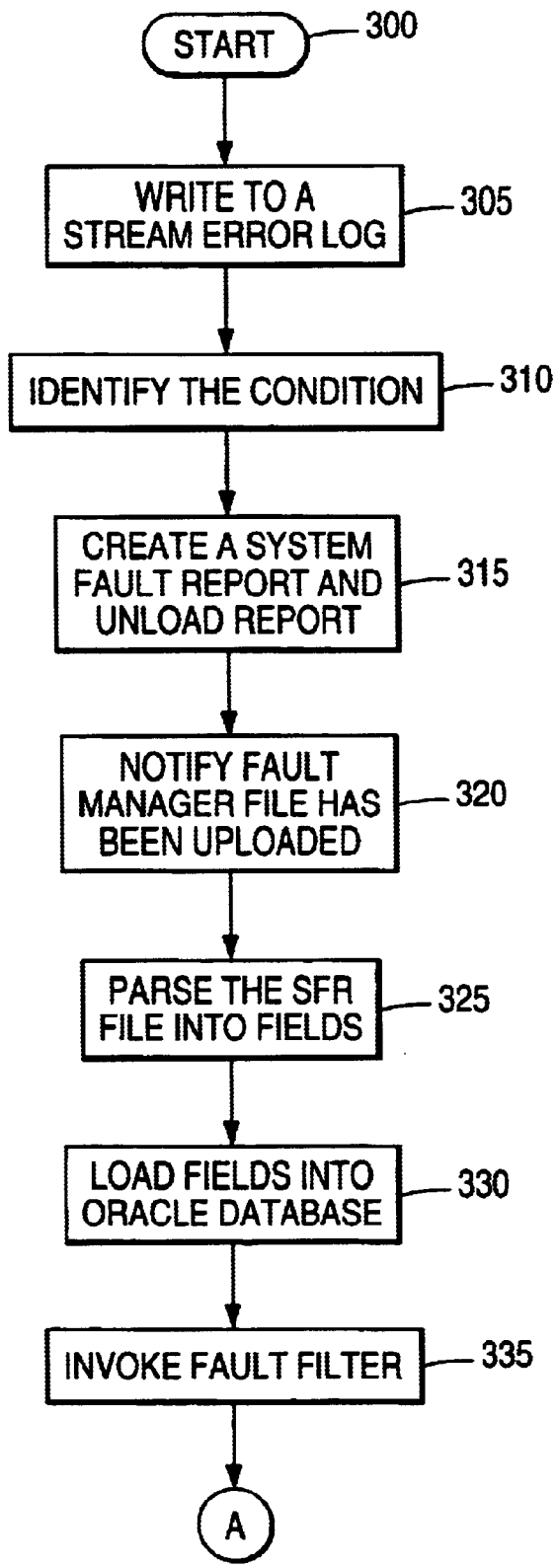
FIGS. 3A–3C are flow diagrams for the method of paging service representatives that a fault has occurred on a customer computer system.
Figure 3B:
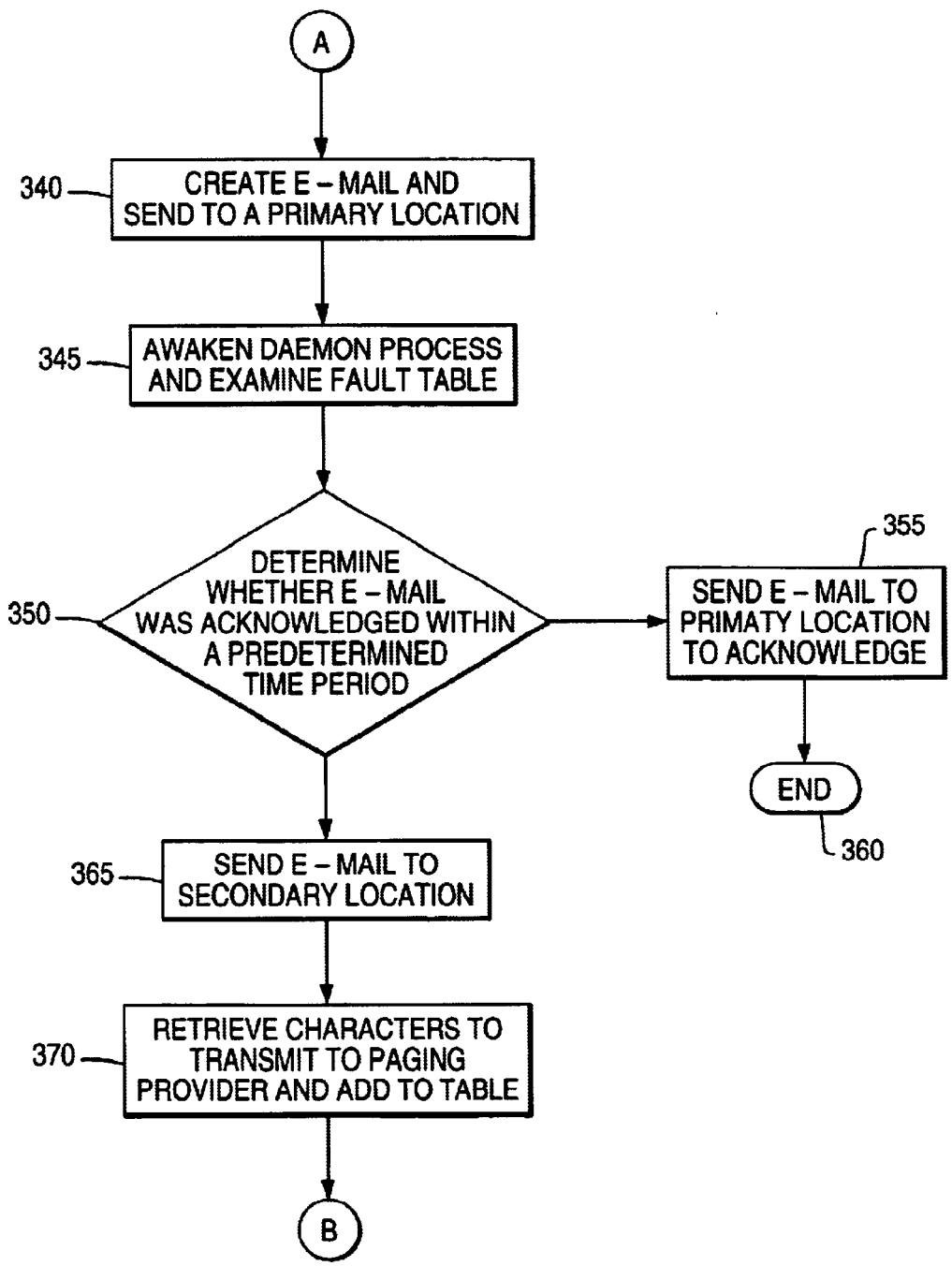
Figure 3C:
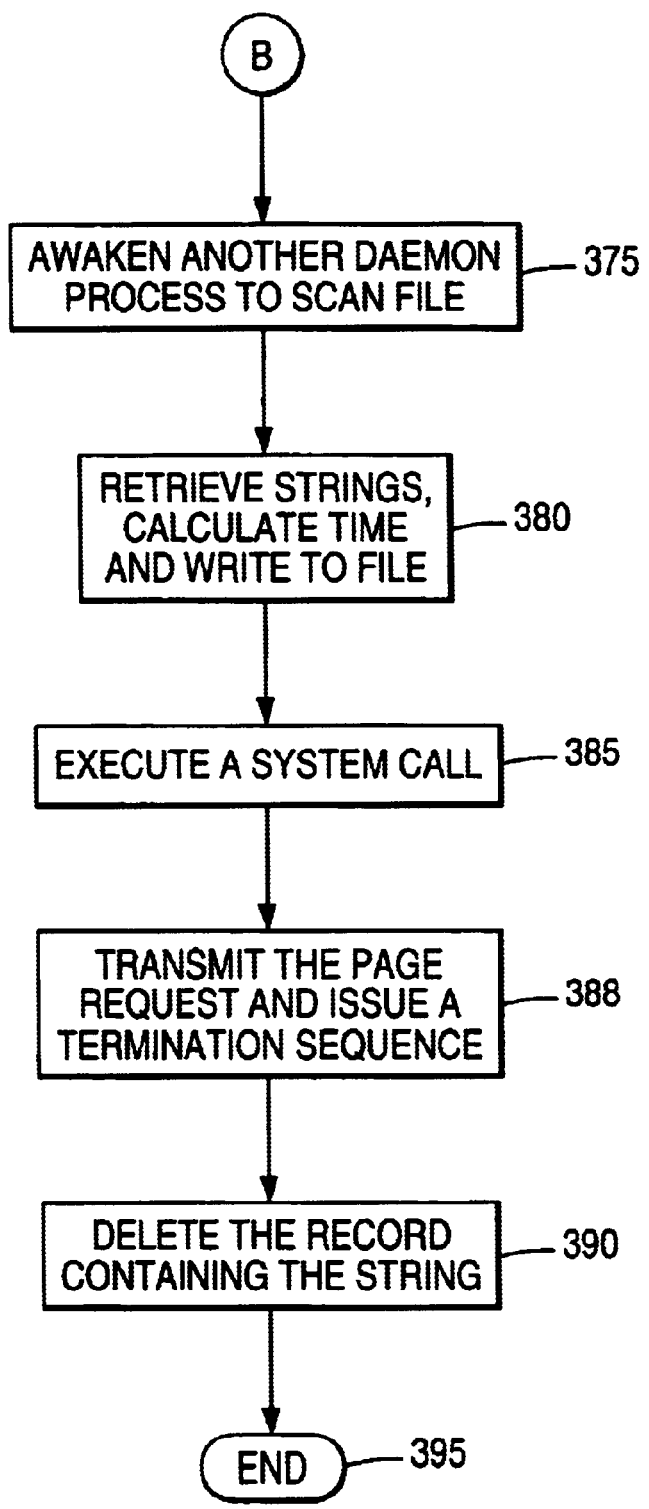

The present invention is called remote services management (RSM) 50 and provides the ability to remotely diagnose customer server problems, both proactively (before the customer notices a problem) and reactively (in response to a customer-reported problem). As depicted in FIG. 2, RSM 50 includes a manager 200 located at a global support center and an agent 240 residing on each remote customer computer system such as the computer system 100. The agent 240 is computer software and may be platform independent.

Although only one remote computer system is depicted it should be understood that any number of remote computer systems are usable with the present invention. RSM 50 encompasses the ability to collect configuration information and provide software management facilities in support of fault management activities.

The logical architecture of the remote server management has two main components: the manager 200 and the agent 240. The boxes in bold (210, 212, 214, 216, 218, 246, 250) represent components that are part of the remote server management 50 of the present invention. Other boxes not bolded are components that are used by RSM 50. The manager 200 includes an Oracle configuration and fault database 210 logically coupled to a beeper daemon 212, HTML and CGI files 214, a configuration manager 216 a fault manager 218 and a Netscape server 228. The beeper daemon 212 is coupled to a modem 224. The configuration manager 216 and fault manager 218 are each separated coupled to a file transfer service 222 which in turn is coupled to a modem 226. A software manager (SWM) 220 is also coupled to the modem 226.

External to the manager 200 is a paging provider(s) 280 coupled to a pager 282. A support analyst 284 (also called remote support person) has access to a Netscape or other browser 286. The support analyst uses a sentinel interface 288 and Unix mail 290. The fault manager 218 is coupled to the Unix mail 290 and the Netscape server 228 is coupled to the Netscape browser 286. The modems 224, 226 are external to the manager 200 and provide an interface thereto.

The agent 240 includes shell files, executable and data files 250 coupled to a CSF 246, an SWMA 248 and an FTS 242. The SWMA and CSF 246 are also coupled to the FTS 242. The FTS is coupled to a modem 238. The modem 238 is external to the agent 240. The modem 238 is remotely coupled to the modem 226.

The agent 240 includes shell scripts and executable image files that collect configuration and fault information and transmit them as files to the manager 200. The manager 200 includes shell scripts and executable image files that process the uploaded files into the software manager (SWM) database 218 and the Oracle database 210, and escalate fault information via Unix e-mail 290 and paging 282, 302. The manager 200 also includes hypertext mark-up language (HTML) and associated Common Gateway Interface (CGI) programs to provide a Web-based interface to the Oracle database 210.

The file transfer service 222 (FTS) is used to support RSM. On the manager side, "ssfts" 222 is a separate package. The FTS 222 supports transmission control protocol (TCP) and asynchronous transmission. The GSCmgr 210–218 package (one of the packages that make up the manager portion of RSM) enforces compression. The default user ID for Async is "nfts". The daemons are started automatically. On the agent 240 side, the protocol is pre-configured for Async only. Compression is enforced. The user ID for Async is gscafts 240. The daemons are started when the agent 240 is (re)started.

The manager 200 will store in an Oracle database collected configuration information uploaded from end user systems (UNIX, NT) via either an agent or flex disk, with the server id (customer number, machine class, and machine serial number) serving as the primary key. The manager 200 will cause an agent 240 to deliver an acknowledgement to the end user system that the information has been stored.

Fault Information Management

The manager 200 will receive and store in an Oracle database fault information uploaded from the end user systems (typically using a Unix platform), with a unique assigned fault id as the primary key. RSM 50 will cause an acknowledgement to be delivered to the end user system that the information has been stored.

E-mail Notification of Faults

The manager 200 will be capable of routing each actionable fault to a customer-specified destination using Unix e-mail capabilities. RSM 50 will maintain and provide user access to information that is used to determine whether a particular fault is actionable, and will maintain and provide user access to information that is used to determine the destination (e.g., a support analyst 284), both primary and secondary, of the e-mail. The format of the e-mail will allow easy cut-and-paste into a computer system used by the recipient, and will contain the number(s) of related incidents previously entered into the fault tracking system.

Web Access to Fault and Configuration Information

The manager 200 will provide a Web page from which a user can view the fault information associated with a specified fault or fault id, along with the configuration of the system on which the fault occurred at either the time of the fault or during a period preceding the fault. The user will be able to specify an incident number that will be stored with the fault information. RSM 50 will provide a Web page from which a user can view the current configuration or the configuration history of any system, given the server id or any part thereof. The Web page will allow a user to compare two configurations for a system and download raw configuration data for off-line processing.

Fault Collection and Escalation

Overview

Fault collection starts at step 300 when a process on an agent 240 writes to a STREAMS error log at step 305 in response to an error or similar condition. Provided that a piece of knowledge exists on that agent 240 to account for the condition, software on the agent 240 identifies the condition at 310 based on the knowledge, and creates a system fault report (SFR) file at step 315. This file is uploaded to the manager 200 during step 315, and the fault manager 218 on the manager 200 is notified at step 320 that the file has been uploaded.

The fault manager software 218 then parses the SFR file into fields at step 325; and these fields are then loaded into the Oracle fault database at step 330, along with the entire SFR file itself.

A fault filter process is then invoked at step 335. Based on entries in two Oracle tables and attributes of the fault (such as the agent 240 on which it occurred), the fault filter process creates Unix e-mail at step 340 containing pertinent information and sends it to a primary destination, noting in the fault record the time that the e-mail was sent.

A process which is running continuously, notifydaemon, periodically awakens at step 345 and examines the fault table for fault records for which e-mail was sent to a primary destination but which have not been acknowledged within a specified period of time at step 350. Acknowledgement occurs at step 355 when a support analyst enters a value in an incident number field in the fault record. For those records, it creates and sends another Unix e-mail message to the primary destination, and notes the time e-mail was sent in the fault record at the process is complete at step 360. For records which have not been acknowledged by the primary destination, e-mail is sent to a secondary destination at step 365. For records which have had e-mail sent to the secondary destination but still have not been acknowledged, notifydaemon retrieves the beeper_notify string (which contains all the characters that are to be transmitted to the paging provider) at step 370 from the route table used to determine the e-mail destinations. It adds this string to the beepQ table.

Another daemon process, beeperdaemon 212, periodically awakens and scans the beepQ table at step 375. It retrieves each string it finds, calculates the amount of time it might take the paging provider to process the page request, and writes at step 350 to the file /opt/gsc/srsm/bin/hand_up.sh two commands: "sleep<num_of_seconds_to)_wait" and "echo~.". Beeperdaemon 212 then executes at step 385 a system call with "/opt/gsc/srsm/bin/hand_up.sh/cu-cACUpager <beep_string>". This transmits the page request at step 388, and issues a termination sequence after it has completed, to free up the modem connection. The beeperdaemon 212 then deletes the record containing the string at step 390. The process is completed at step 395.

Agent Side
Customer Support Facility (CSF)

The normal route of a fault is via the streams log (or usererr, /dev/osm . . . ) . If an error occurs for which a knowledge case is known, it should be recognized by the pattern matching daemon (gscapmd) which in turn calls gensfr to create a fault record. gensfr can also be called by gscasfr either way an SFR has now been created and is ready to be shipped. At this point the SFR is in two locations (/var/opt/gsc/data/SFR/"USID" and /var/opt/gsc/data/SFR.upload/"USID")and it is now the responsibility of the monitor daemon (smonitord) to send the file to the GSC manager 200. Smonitord should have received a wake-up call (SIGUSR1 from gensfr calling sig_smon, which actually sends the signal) and now scans the upload directories and determines files needed to be uploaded. It now dispatches called to create a connection to the GSC manager 200. Upon connection smonitord logs in as nfts which executes /var/opt/fts/bin/ftsasy.sh which creates an FTS session between agent and manager. Smonitord now sends the SFR from the SFR.upload directory to the manager (sends to /var/opt/gsc/data/SFR/"CUSTID,CLASS,SER#" and upon successful completion of /opt/gsc/rsm/bin/faultmgr deletes the files from the SFR.upload directory and if "save SFR" is off from SFR."USID". If there is an error in transmission a retry will occur (/opt/gsc/data/params.db ("RETRY=")) in the specified time frame.

On the manager side /opt/gsc/rsm/bin/faultmgr invokes /opt/gsc/srsm/bin/srsmfault to do the actual upload of the SFR into the Oracle database 110. This is now a "viewable" fault via Netscape browser 306 referenced by "CUSTID,Class,SER#"/FAULTID, where CUSTID,CLASS,SER# is the agent name from /opt/gsc/data/params.db ("HOST_NAME="), and FAULTID is the nth fault from installation.

Changes Made to CSF

The gscagui provides an option to start the fault browser to view the faults. The browser (sss_browser) is invoked through browse.sh which is a part of the graphical interface provided by the standard CSF product.

1. Save SFR option—The interface in the Command menu allows for the configuring of the agent 240 to save the SFRs (fault reports). The default is set to No. Selecting the option Save SFR from the command menu which brings up a popup menu with buttons for selecting either Yes or No. If the value is changed to Yes the SFRs are not removed after they have been transmitted and are waiting for resolution by GSC. The current value for the option is displayed on the last line of the browser window. The option value is written to a file /var/opt/gsc/data/sfr.save as SAVE=Y or SAVE=N which is interpreted by other code (rmsfr script) to check and save/remove the sfr files.

2. Status field for fault window—The fault window of the browser reflects the status of the fault. The two states a fault can be in is either "Waiting for escalation" or "Needs resolution".When a fault is created the file is kept in the /var/opt/gsc/data/SFR/<usid>/*.sfr and linked to the /var/opt/gsc/data/SFR.upload/<usid>/ *.sfr. At this stage, the status of the fault is "Waiting for escalation". FTS picks the SFR from the upload directory and transfers it to the manager to be uploaded into the manager database 210. On successful upload the links are removed. The status of the fault is now "Needs resolution". If the Save SFR option is no then the file is also removed from /var/opt/gsc/dataSFR/<usid>/. At this point, the fault is no longer viewable from the fault window. If the option was set to no, the fault would show up with the acknowledged status.

Manager Side
Loading Fault Information Into Oracle Database

An "sfrload" program has been designed to get the fielded information out of the ".sfr" file. The sfrload program will also do a background system call to the fault filter program 218. The information can then be viewed by an analyst using the Netscape browser 286. The sfrload program can be executed from the command line and it returns 0 if it was successful. More often than otherwise, the sfrload program is used by the "srsmfault" script which is called by the "faultmgr" script, when RSM 250 has transferred ".sfr" files from a remote customer computer system. The program sfrload is in the "/opt/gsc/srsm/bin"directory. The sfrload program makes use of the fault table. The sfrload program does not use the "sfr" file directly. The sfrload program makes use of a utility program "sdump" which will read the file and produce a readable ASCII file. With the aid of a lex and yacc engine, the sfrload program then parses this ASCII file and inserts the fielded information into the database. The lex part of the program is contained in "sfrload.1". and the parser part written in yacc is in sftload.y. "sfrload" logs an error to the error log when an error has occurred. The text of the message should indicate what type of Oracle database error it was. The sfrload program will also log errors for bad arguments and file input errors. The sfrload program has the following command line options.

sfrload [-d}]-u <user id>-t<Unix timestamp> [-I}]<file>

The -d option is an optional debug argument that when used will print the data s it is read from the input file and separated into fields.

The following two arguments, -u and -t are always required.

The -u argument is the usid string which consists of the <cust_id>, <class_num>, and <serial_num>with lengths of 11, 4 and 8–12, respectively.

The -t required argument if the Unix timestamp which is an integer number representing the number of second from 1/1/1970.

The -i optional parameters followed by a valid filename with read permission. Instead of using the default file in the path associated with the -u option, the -i option can be used. This filename will override the default. The sfrload program is expecting the raw ".sfr" file.

Fault Escalation to the Primary Destination

The fault filter process 218 is an executable file that accepts the timestamp, server_id and fault number as parameters in order to send e-mail to a support representative. First, this process accesses the fault table to gather information associated with the fault number passed into the program. Then, the action to be taken on the fault is determined by searching the action table based different keys (customer, server id, fault type). The valid actions are nothing, e-mail or automated incident. The action table is searched using the different keys in the following order: customer id, server id (customer id/serial number/class number) and fault type. The first entry found for any of the keys is used. If an entry is not found in the action table, a default value is used. If the "e-mail" action in chosen, the program searches the route table for the primary e-mail destination. This search is done with the following keys in this order: server id (customer id/class number/serial number), customer id, class number or fault. The first entry found for any of the keys is used. If an entry is not found in the route table, a default value is used. Once the e-mail information has been retrieved, the fault report is built. This report contains fault information previously gathered and customer/machine information retrieved from the customer and machine tables. The report also contains any incidents associated with the customer's serial number. To retrieve this information, the fault filter process 218 accesses two Sentinel databases through the Sentinel interface 288. After the report has been generated, it is sent to the primary e-mail destination. At this point, the fault record in the fault table is updated with the primary destination, the current system time and the action taken (nothing, e-mail, incident).

Fault Escalation to the Secondary Destination

A process which is running continuously, notifydaemon, periodically awakens and examines the fault table for fault records for which e-mail was sent to a primary destination but which have not been acknowledged within a specified period of time. Acknowledgement occurs when a support analyst enters a value in an incident number field in the fault record. For those records, it creates and sends another Unix e-mail message to the primary destination, and notes the time e-mail was sent in the fault record. For records which have had e-mail sent to the secondary destination but still have not been acknowledged, notifydaemon retrieves the beeper_notify string (which contains all the characters that are to be transmitted to the paging provider) from the route table used to determine the e-mail destinations. It adds this string to the beepQ table.

Unacknowledged Faults

Another daemon process, beeperdaemon, periodically awakens and scans the beepQ table. It retrieves each string it finds, calculates the amount of time it might take the paging provider to process the page request, and writes to the file /opt/gsc/srsm/bin/hang_up.sh two commands: "sleep<num_of_seconds_to_wait" and "echo~.". Beeperdaemon 212 then executes a system call with "/opt/gsc/srsm/bin/hand_up.sh / cu -cACUpager<beep_string>". This transmits the page request, and issues a termination sequence after it has completed, to free up the modem connection. It then deletes the record containing the string.

Support Programs
Action and Route Scripts

The scripts to manage the action and route tables are implemented as two separate shell files, named "action" and "route", and are found in /opt/gsc/srsm/bin. Each script is invoked with a single parameter: 'add' to add an entry, 'delete' to remove an entry, or 'view' to save the values for an entry in a file. Each prompts the user for data that will uniquely identify an entry in a table, and then for the rest of the data that is to be associated with that entry. After all necessary data has been entered (and for add and delete, the user has confirmed the action desired), the shell file creates the appropriate SQL command in a temporary file and executes sqlplus with the name of that file. Where possible, it reports back to the user the status of the command. The scripts access /opt/gsc/srsm/bin/oraenv.sh to retrieve environment variables necessary to invoke sqlplus, and thus require root privilege to execute.

Action Script

The action script allows a user to manage entries in the action table. Each entry consists of a set of fields which make up a unique key, and an action value. The key can be one of 'DEFAULT' (in the site ID field), a site ID, a server ID (site ID/class/serial number), or a fault. The script prompts for only the values that are still needed; i.e., if the user enters a carriage return for the site ID prompt, the script will prompt for a fault next.

To add an entry, the script prompts for a 0, 1 or 2 for the action field after the key has been entered. The script displays the key and action value and asks for confirmation from the user. It then invokes an SQL command to determine if there is an entry in the table that has that key; if so, it informs the user and exits. Otherwise, it invokes the created SQL insert command via sqlplus.

To delete an entry, the script prompts for a key, displays the key and asks for confirmation, and invokes the delete SQL command. It displays the number of rows deleted by sqlplus (this should be 0 if there is no entry with this key, and 1 if there is exactly one entry).

To view an entry, the script prompts for a key, and invokes a set of SQL select commands to retrieve the fields of the entry. It sends this output to a file named /tmp/<key>, where <key> is the set of key fields entered.

Route Script

The route script allow's a user to manage entries in the route table. Each entry consists of a set of fields which make up a unique key, a primary, secondary, and informational destination, and a paging string. The key can be one of 'DEFAULT' (in the site ID field), a site ID, a class number, a server ID (site ID/class/serial number), or a fault. The script prompts for only the values that are still needed; i.e., if the user enters a carriage return for the site ID prompt and class number, the script will prompt for fault next.

To add an entry, the script prompts for the name of the primary destination. If a value is entered, the script then prompts for the rest of the fields associated with a destination (e.g., e-mail address). No checking is done on the values entered for these fields. If no value is entered for the name field, the script prompts for the name of the secondary destination, and then for the informational destination. After prompting for the fields for the informational destination, it prompts for the paging string. The script displays the key and action value and asks for confirmation from the user. It then invokes an SQL command to determine if there is an entry in the table that has that key; if so, it informs the user and exits. Otherwise, it invokes the created SQL insert command via sqlplus.

To delete an entry, the script prompts for a key, displays the key and asks for confirmation, and invokes the delete SQL command. It displays the number of rows deleted by sqlplus (this should be 0 if there is no entry with this key, and 1 if there is exactly one entry).

To view an entry, the script prompts for a key, and invokes a set of SQL select commands to retrieve the fields of the entry. The fields in an entry are not all selected at once, since the output of sqlplus would be unreadable. Thus, only a few fields are selected per statement. The script sends this output to a file named /tmp/>key>, where <key>is the set of key fields entered.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof

What is claimed is:

1. A method of notifying at least one remote support person of a fault on a computer system on a computer network, comprising:
   gathering configuration information for each computer system on the computer network and storing the information in a database;
   determining a fault has occurred on a computer on the computer network;
   providing fault information specific to the fault determined on the computer to a web page viewable on the computer network;
      sending notification of the fault to a first remote support person;
      if the remote support person does not respond within a predetermined time interval, sending notification to another remote support person.

2. The method of claim 1, comprising if the first remote support person does not respond within a predetermined time interval inserting an entry into a first database.

3. The method of claim 1, comprising selecting recipients for sending notification of the fault.

4. The method of claim 1, comprising storing the occurrence of the fault and e-mail routing data of the notification in a relational database.

5. The method of claim 1, comprising determining whether the fault is actionable.

6. The method of claim 1, wherein the computer network is the Internet.

7. The method of claim 1, wherein the fault information includes a fault ID and a configuration of the computer system on which the fault occurred.

8. The method of claim 2, comprising if another remote support person does not respond within a predetermined time interval, inserting an entry into a second database.

9. The method of claim 3, comprising providing criteria for said selecting step including the type of fault, type of computer system and customer.

10. The method of claim 2, comprising scanning the first database and if neither of the remote support person responds within a predetermined time interval, inserting an entry into a table.

11. The method of claim 1, wherein the web page is adapted to receive an incident number from the remote support person.

12. The method of claim 1, wherein the web page includes raw configuration data of the computer system for off-line processing.

13. The method of claim 10, wherein the entry includes a paging phone number, a numeric value and a log of the lack of response.

14. The method of claim 1, wherein the configuration information includes hardware information, an inventory of installed software, and a time stamp for the stored information.

15. The method of claim 10, comprising sending a command to initiate said scanning step.

16. The method of claim 1, wherein the web page includes fault information.

17. An article comprising:
   at least one sequence of machine executable instructions;
   a medium bearing the executable instructions in machine readable form, wherein execution of the instructions by one or more processors causes the one or more processors to:
      determine a fault has occurred on a computer on the computer network;
      gather configuration information for each computer system on the computer network and storing the information in a database;
      provide fault information specific to the fault determined on the computer to a web page viewable on the computer network, wherein the fault information includes a fault ID and a configuration of the computer system on which the fault occurred;
      send notification of the fault to a first remote support person;
      if the remote support person does not respond within a predetermined time interval, send notification to another remote support person.

18. A computer architecture, comprising:
   means for gathering configuration information for each computer system on the computer network and storing the information in a database;
   determining means for determining a fault has occurred on a computer on the computer network;
   providing means for providing fault information specific to the fault determined on the computer to a web page viewable on the computer network, wherein the fault information includes a fault ID and a configuration of the computer system on which the fault occurred;
   sending means for sending notification of the fault to a first remote support person; and
   notification means for sending notification to another remote support person if the remote support person does not respond within a predetermined time interval.

19. A computer system, comprising:
   a processor; and
   a memory coupled to said processor, the memory having stored therein sequences of instructions, which, when executed by said processor, causes said processor to perform the steps of:
      gathering configuration information for each computer system on the computer network and storing the information in a database;
      determining a fault has occurred on a computer on the computer network;
      providing fault information specific to the fault determined on the computer to a web page viewable on the Internet, wherein the fault information includes a fault ID and a configuration of the computer system on which the fault occurred;
      sending notification of the fault to a first remote support person; and
      if the remote support person does not respond within a predetermined time interval, sending notification to another remote support person.

* * * * *